(12) United States Patent
Kodama

(10) Patent No.: US 9,137,783 B2
(45) Date of Patent: Sep. 15, 2015

(54) RADIO COMMUNICATION TERMINAL DEVICE AND RADIO COMMUNICATION METHOD

(75) Inventor: Takeshi Kodama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 56 days.

(21) Appl. No.: 13/292,363

(22) Filed: Nov. 9, 2011

(65) Prior Publication Data

US 2012/0128046 A1    May 24, 2012

(30) Foreign Application Priority Data

Nov. 22, 2010    (JP) ................................ 2010-260191

(51) Int. Cl.
*H04B 1/00* (2006.01)
*H04W 72/02* (2009.01)
*H04W 48/18* (2009.01)
*H04W 72/04* (2009.01)

(52) U.S. Cl.
CPC .............. *H04W 72/02* (2013.01); *H04W 48/18* (2013.01); *H04W 72/042* (2013.01)

(58) Field of Classification Search
CPC .......... H04B 1/40; H04B 1/3838; H04B 7/26; H01Q 1/38; H04W 76/023; H04W 76/027; H04W 8/005
USPC ........................... 455/158.1, 186.1, 179.1, 77
See application file for complete search history.

(56) References Cited

U.S. PATENT DOCUMENTS

| | | | | |
|---|---|---|---|---|
| 7,024,191 B2 * | 4/2006 | Ofuji et al. | ................. | 455/432.1 |
| 8,260,232 B2 * | 9/2012 | Kim et al. | ................. | 455/186.1 |
| 2007/0211669 A1 | 9/2007 | Umatt et al. | | |
| 2008/0220778 A1 | 9/2008 | Ekstedt et al. | | |
| 2009/0124224 A1 | 5/2009 | Hildebrand et al. | | |
| 2009/0170440 A1 * | 7/2009 | Eyuboglu et al. | ............. | 455/63.3 |
| 2012/0040673 A1 * | 2/2012 | Ying et al. | ..................... | 455/436 |
| 2012/0165065 A1 * | 6/2012 | Sawada et al. | ................ | 455/525 |
| 2012/0258749 A1 * | 10/2012 | Lenzini et al. | ................ | 455/509 |

(Continued)

FOREIGN PATENT DOCUMENTS

| | | |
|---|---|---|
| EP | 2214441 A1 | 8/2010 |
| JP | 2007-116561 A | 5/2007 |

(Continued)

OTHER PUBLICATIONS

JPOA—Office Action of Japanese Patent Application No. 2010-260191 dated Apr. 8, 2014 with Partial Translation.
JPOA—Office Action of Japanese Patent Application No. 2010-260191 dated Oct. 21, 2014 with partial English Translation.

*Primary Examiner* — Andrew Wendell
*Assistant Examiner* — Maryam Soltanzadeh
(74) *Attorney, Agent, or Firm* — Fujitsu Patent Center

(57) ABSTRACT

A radio communication terminal device includes a storage unit that stores group information indicating a group of frequencies belonging to the same communication carrier, a communication-carrier searching unit that selects one of to-be-selected frequencies, the to-be-selected frequencies being frequencies at which radio waves arrive, and that searches for a communication carrier using the selected frequency on a basis of identification information received at the selected frequency, and a search-execution controlling unit that excludes, from the to-be-selected frequencies, another frequency that belongs to the group information including the selected frequency and that is other than the selected frequency.

8 Claims, 16 Drawing Sheets

(56) References Cited

U.S. PATENT DOCUMENTS

2013/0231115 A1* 9/2013 Lin .............................. 455/436
2015/0131468 A1* 5/2015 Navarro

FOREIGN PATENT DOCUMENTS

JP  2009-529837  8/2009
JP  2010-521091  6/2010

* cited by examiner

FIG. 6

| FREQUENCY | RESULT |
|---|---|
| 2501000 | x |
| 2501250 | x |
| ... | ... |
| f1 | O |
| f2 | O |
| ... | ... |
| 2685000 | x |

FIG. 7

| INFORMATION SOURCE | ADJACENT BASE STATION | FRAME SYNCHRONIZATION |
|---|---|---|
| f1 | f2 | O |
|  | f3 | x |
| f2 | f1 | O |
|  | f3 | x |
| ... | ... | ... |
| f8 | f7 | O |
|  | f9 | O |
| f9 | f7 | O |
|  | f8 | O |

FIG. 8

| FREQUENCY | RESULT |
|---|---|
| f1 | A |
| f2 | A |
| ... | ... |
| f4 | B |
| ... | ... |
| f8 | C |
| f9 | C |

FIG. 11

| ADJACENT BASE-STATION INFORMATION |
|---|
| CURRENT FRAME NUMBER |
| FREQUENCY f2 OF ADJACENT BASE-STATION INFORMATION |
| FREQUENCY f3 OF ADJACENT BASE-STATION INFORMATION |

FIG. 13

DL-MAP

| CURRENT FRAME NUMBER |
| --- |
| INFORMATION TYPE: ADJACENT BASE-STATION INFORMATION |
| REPORT TIME: 231100FRAME |

FIG. 14

| FREQUENCY | REPORT FRAME NUMBER |
|---|---|
| f1 | 231100FRAME |
| f2 | 231100FRAME |
| f3 | 231500FRAME |
| ... | ... |
| f8 | 121800FRAME |
| f9 | 121800FRAME |

RADIO COMMUNICATION TERMINAL DEVICE AND RADIO COMMUNICATION METHOD

CROSS-REFERENCE TO RELATED APPLICATIONS

This application is based upon and claims the benefit of priority of the prior Japanese Patent Application No. 2010-260191, filed on Nov. 22, 2010, the entire contents of which are incorporated herein by reference.

FIELD

The embodiments discussed herein relate to a radio communication terminal device and a radio communication method.

BACKGROUND

When a radio communication terminal device is powered on, the radio communication terminal device searches for a base station and connects to the base station. In this case, the radio communication terminal device uses a frequency at which a communication carrier provides a service. The term "communication carrier" as used herein refers to a network operator, a communication service provider, a telephone company, or the like. The radio communication terminal device performs the above-described processing, even when it is outside a communication service area.

However, immediately after the radio communication terminal device is shipped from a factory or when the radio communication terminal device is used abroad, the radio communication terminal device searches for a frequency at which a desired communication carrier provides a service (the search is also called "Network Discovery"). The reason why the radio communication terminal device searches for a frequency is that it does not have frequency information of the communication carrier.

The frequency search generally involves two procedures: band search and carrier search. In the band search, frequencies at which radio frequencies arrive are searched for. The radio communication terminal device performs the band search by checking each of the frequencies included in the frequency band for radio communication. In the carrier search, a frequency used by a desired communication carrier is searched for. The radio communication terminal device performs the carrier search by checking the frequencies found in the band search. Upon finding the frequency used by the desired communication carrier, the radio communication terminal device connects to a base station by using the found frequency.

Information used for identifying the communication carrier is reported from the base station. For example, in WiMAX (Worldwide Interoperability for Microwave Access), the communication carrier identification information is contained in a control message called a "downlink channel descriptor (DCD)". The radio communication terminal device captures a radio wave at the frequency found in the band search. Next, the radio communication terminal device receives communication carrier identification information from the base station using the found frequency. The radio communication terminal device then uses the communication carrier identification information to determine whether or not the frequency is used by the desired communication carrier.

A technology in which a radio communication terminal device searches for an only frequency at which a signal carrier wave exists is known (refer to Japanese Laid-open Patent Publication No. 2007-116561).

SUMMARY

According to an aspect of the embodiment, a radio communication terminal device includes: a storage unit that stores group information indicating a group of frequencies belonging to the same communication carrier, a communication-carrier searching unit that selects one of to-be-selected frequencies, the to-be-selected frequencies being frequencies at which radio waves arrive, and that searches for a communication carrier using the selected frequency on a basis of identification information received at the selected frequency, and a search-execution controlling unit that excludes, from the to-be-selected frequencies, another frequency that belongs to the group information including the selected frequency and that is other than the selected frequency.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a table illustrating one example of band-search results stored in a search-result storage unit in the second embodiment;

FIG. 7 is a table illustrating one example of adjacent base-station information in an adjacent-base-station information storage unit in the second embodiment;

FIG. 8 is a table illustrating one example of carrier-search results stored in the search-result storage unit in the second embodiment;

FIG. 11 illustrates one example of the adjacent base-station information;

FIG. 13 illustrates one example of a DL-MAP;

FIG. 14 is a table illustrating one example of report-time information;

DESCRIPTION OF EMBODIMENTS

According to the technology described above, the radio communication terminal device can reduce the time taken for the band search. However, since the communication carrier identification information is reported from the base station periodically (e.g., at intervals of 10 seconds in the rated value in WiMAX), the radio communication terminal device needs to wait until it receives the communication carrier identification information from the base station. Thus, it takes a long time to perform the carrier search. Accordingly, a conventional radio communication terminal device requires a large amount of time to receive a communication service from a desired communication carrier.

In addition, in an environment where a large number of base stations are installed, when a base station belonging to a communication carrier other than the desired communication carrier exists, the number of times a conventional radio communication terminal device performs the carrier search increases. Accordingly, the conventional radio communication terminal device may require a larger amount of time to receive a communication service from a desired communication carrier.

Such a problem is not limited to WiMAX and is encountered in other radio communication schemes for performing radio communication.

[a] First Embodiment

Figure 1:
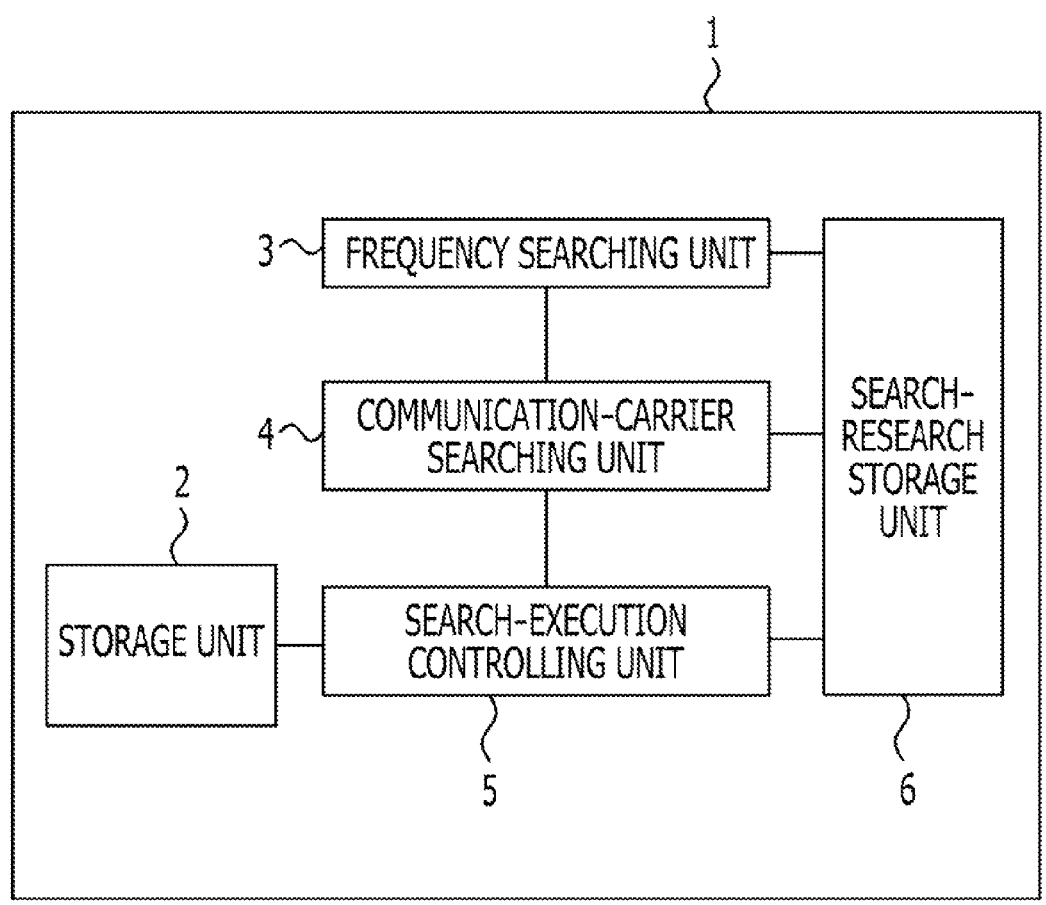
FIG. 1 is a block diagram illustrating one example of a radio communication terminal device according to a first embodiment.

FIG. 1 is a diagram illustrating one example of a radio communication terminal device according to a first embodiment.

A radio communication terminal device 1 includes a storage unit 2, a frequency searching unit 3, a communication-carrier searching unit 4, a search-execution controlling unit 5, and a search-research storage unit 6.

The storage unit 2 stores information of a frequency group. The frequency group is a group of frequencies used by the same communication carrier. One example of information of the frequency group is adjacent base-station information. For example, when a base station that performs transmission at a frequency f1 exists, the storage unit 2 stores, as adjacent base-station information, frequencies f2 and f3 of two adjacent base stations that are adjacent to that base station and that belong to the same carrier.

The frequency group in the first embodiment is adjacent base-station information. However, the frequency group is not limited to the adjacent base-station information and may be any frequency group used by the same communication carrier. For example, the radio communication terminal device 1 may pre-store, in the storage unit 2, the information of frequencies used by desired communication carriers.

The frequency searching unit 3 searches for frequencies at which radio waves arrive. More specifically, the frequency searching unit 3 searches for, of frequencies included in the frequency band for radio communication, frequencies at which radio waves arrive at the radio communication terminal device 1. The frequency searching unit 3 may also search for frequencies at which radio-wave intensities are higher than or equal to a threshold. Frequencies found by the frequency searching unit 3 will hereinafter be referred to as "frequency candidates".

The communication-carrier searching unit 4 selects a frequency from the frequency candidates found by the frequency searching unit 3. The frequency that the communication-carrier searching unit 4 selects from the frequency candidates will hereinafter be referred to as a "selected frequency". In addition, the communication-carrier searching unit 4 searches for a communication carrier using the selected frequency. For example, the communication-carrier searching unit 4 searches for a communication carrier for a base station using the selected frequency, on the basis of communication carrier identification information reported at the selected frequency. The communication carrier identification information is reported from the base station at predetermined periods.

The search-execution controlling unit 5 excludes, from the frequency candidates, the frequencies belonging to the same communication carrier as the selected frequency. When the communication carrier found by the communication-carrier searching unit 4 is not a predetermined communication carrier, the search-execution controlling unit 5 refers to, of the adjacent base-station information stored in the storage unit 2, the adjacent base-station information including the selected frequency. The search-execution controlling unit 5 then excludes, from the frequency candidates, the frequencies that are other than the selected frequency and that are included in the adjacent base-station information.

The search-execution controlling unit 5 then refers to the adjacent base-station information including the selected frequency. The search-execution controlling unit 5 refers to, of the frequencies included in the adjacent base-station information, the frequency whose communication carrier is known. The search-execution controlling unit 5 then stores, in the search-research storage unit 6, the communication carrier using the frequency as a communication carrier-search result for the selected frequency.

When the selected frequency is not included in the adjacent base-station information, the search-execution controlling unit 5 causes the communication-carrier searching unit 4 to search for a communication carrier using the selected frequency. When a communication carrier using another frequency belonging to the adjacent base-station information is not known, the search-execution controlling unit 5 also causes the communication-carrier searching unit 4 to search for a communication carrier using the selected frequency.

The search-research storage unit 6 stores the frequency candidates and the result of the communication carrier search.

One example of an operation of the radio communication terminal device 1 will be described below.

When the operation mode of the radio communication terminal device 1 changes from a communication shutoff mode to a communication standby mode, the radio communication terminal device 1 performs band search. For example, the band search is performed when the radio communication terminal device 1 is powered on or the radio communication terminal device 1 is outside a communication service area. In this case, the frequency searching unit 3 searches for frequencies at which radio waves arrive.

Figure 2:
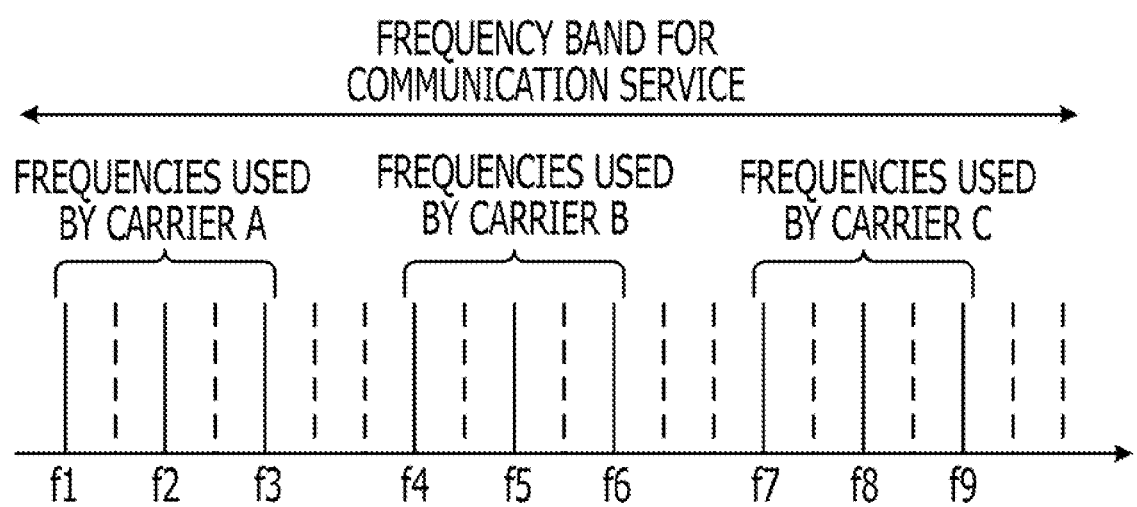
FIG. 2 is a diagram illustrating one example of a frequency band of a communication service according to the first embodiment.

FIG. 2 is a diagram illustrating one example of a frequency band of a communication service according to the first embodiment. The horizontal axis indicates frequency.

The frequency band of the communication service includes frequencies used by individual communication carriers. In the example illustrated in FIG. 2, communication carrier A uses frequencies f1, f2, and f3, communication carrier B uses frequencies f4, f5, and f6, and communication carrier C uses frequencies f7, f8, and f9.

The frequency searching unit 3 searches for, in the frequency band for radio communication, signal frequencies having higher radio-wave intensities than a threshold of a radio-wave intensity needed to receive the communication service. The frequency searching unit 3 stores a band-search result in the search-research storage unit 6. For example, when the frequency searching unit 3 is assumed to have found the frequencies f1 to f9 in FIG. 2, the frequency searching unit 3 stores the frequencies f1 to f9 in the search-research storage unit 6.

Although the above description has been given of a case in which the frequency searching unit 3 searches for radio waves having higher intensities than the threshold, what is be searched for is not limited thereto. For example, the frequency searching unit 3 may search for frequencies at which radio waves are present.

The communication-carrier searching unit 4 then performs communication-carrier search on each of the frequency candidates. Thus, the communication-carrier searching unit 4 selects a frequency from the frequency candidates. The communication-carrier searching unit 4 performs carrier search on the selected frequency.

The carrier search is performed using the communication carrier identification information reported from the base station using the selected frequency. For example, the communication carrier identification information is reported from the base station that performs transmission at the frequency f1 illustrated in FIG. 2. This communication carrier identification information indicates the communication carrier A.

In this case, the communication carrier identification information is used as an example of information used for the carrier search. However, the information used for the carrier search is not limited to the communication carrier identification information. The information used for the carrier search may be any information that allows a communication carrier to be identified.

The communication-carrier searching unit 4 waits until the communication carrier identification information is reported from the base station using the selected frequency. Upon receiving the communication carrier identification information, the communication-carrier searching unit 4 performs the carrier search on the basis of the received communication carrier identification information. The communication-carrier searching unit 4 then stores a carrier-search result in the search-research storage unit 6.

When the communication-carrier searching unit 4 performs the carrier search, the search-execution controlling unit 5 refers to the adjacent base-station information stored in the storage unit 2. For example, the storage unit 2 stores the frequencies f2 and f3 of two adjacent base stations, (as illustrated in FIG. 2) belonging to the communication carrier A, in conjunction with the frequency f1 of the local station.

When the selected frequency is included in the adjacent base-station information and the carrier search has been completed on at least one of the frequencies included in the adjacent base-station information, the search-execution controlling unit 5 excludes the selected frequency from the frequency candidates. For example, when the communication-carrier searching unit 4 searches for a communication carrier using a frequency f2 as illustrated in FIG. 2, the search-execution controlling unit 5 checks whether or not the frequency f2 is included in the adjacent base-station information. For example, when the frequency f2 is registered as the adjacent base-station information of the base station using the frequency f1 and the communication carrier using the frequency f1 is already found, the frequency f2 is excluded from the searching to be performed by the communication-carrier searching unit 4.

As a result, the communication-carrier searching unit 4 omits the carrier search on the excluded frequency.

When the communication-carrier searching unit 4 omits the carrier search, the search-execution controlling unit 5 refers to the adjacent base-station information including the frequency on which the carrier search is omitted. The search-execution controlling unit 5 stores, in the search-research storage unit 6, the communication carrier using the frequency included in the referred-to adjacent base-station information as a communication carrier-search result for the frequency on which the carrier search is omitted.

A frequency on which the carrier search can be omitted is a frequency belonging to adjacent base-station information including at least one frequency whose communication carrier is known. Thus, by using the adjacent base-station information, the radio communication terminal device 1 can identify a communication carrier using a certain frequency.

According to the radio communication terminal device 1 described above, since there is a possibility that the carrier search on the frequencies included in the adjacent base-station information can be omitted, the radio communication terminal device 1 can reduce the time taken for the carrier search and also can quickly receive a communication service.

The search-execution controlling unit 5 may also be adapted to exclude the frequencies included in the adjacent base-station information stored in the transmission medium 2 from the search performed by the frequency searching unit 3.

[b] Second Embodiment

Figure 3:
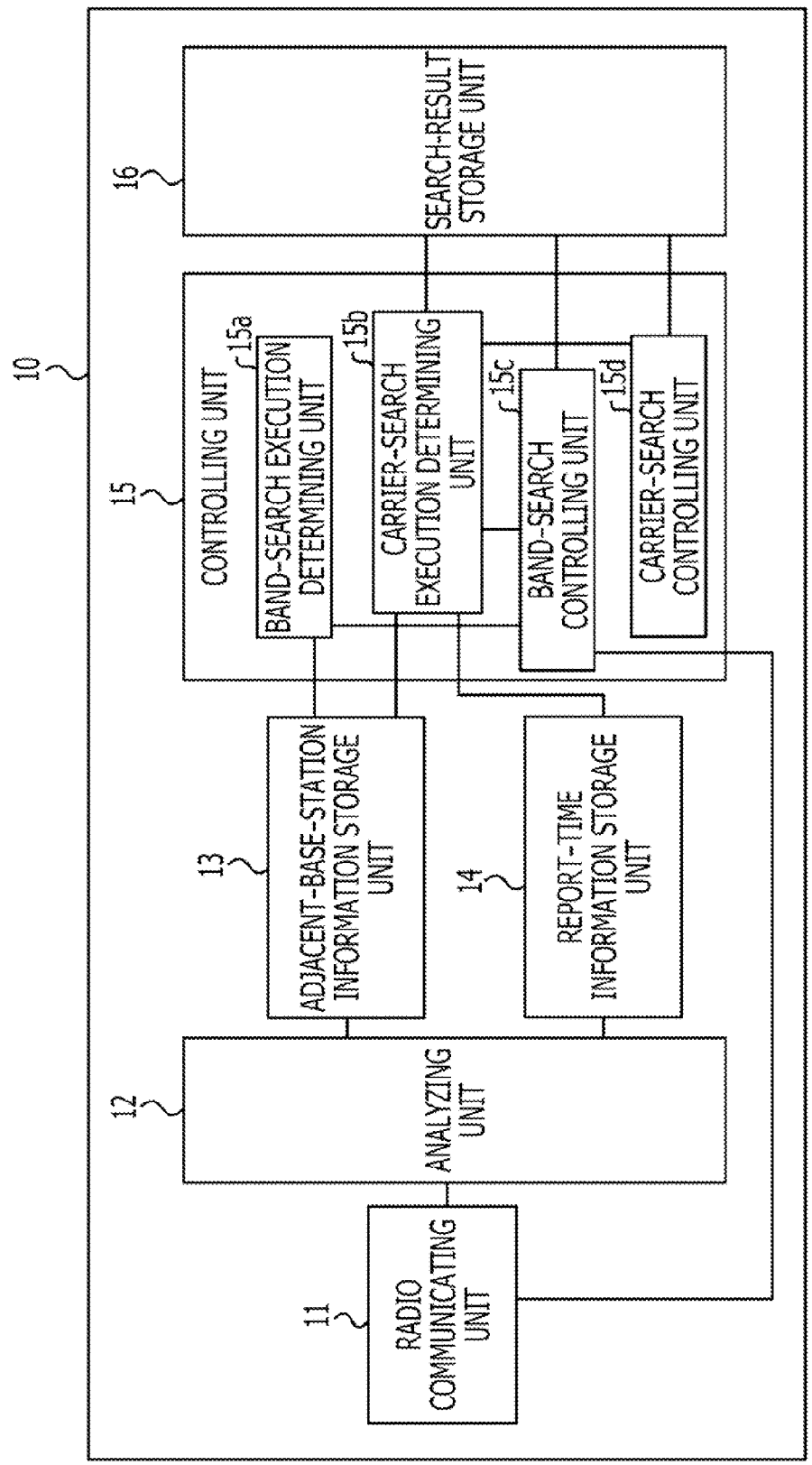
FIG. 3 is a block diagram illustrating one example of a radio communication terminal device according to a second embodiment.

FIG. 3 is a block diagram illustrating one example of a radio communication terminal device according to a second embodiment.

A radio communication terminal device 10 is directed to a device for transmitting or receiving signals by using radio waves. Examples of the radio communication terminal device 10 include a mobile phone and a notebook PC (Personal Computer) having a radio communication function.

The radio communication terminal device 10 includes a radio communicating unit 11, an analyzing unit 12, an adjacent-base-station information storage unit 13, a report-time information storage unit 14, a controlling unit 15, and a search-result storage unit 16.

The radio communicating unit 11 performs radio communication with a base station (not illustrated).

The analyzing unit 12 analyzes information received from the base station. Through the analysis of the information, the analyzing unit 12 obtains the adjacent base-station information. The analyzing unit 12 then stores the obtained adjacent base-station information in the adjacent-base-station information storage unit 13. The analyzing unit 12 further stores, in the report-time information storage unit 14, report-time information indicating the time at which the obtained adjacent base-station information was reported.

The adjacent-base-station information storage unit 13 has a function of the storage unit 2 illustrated in FIG. 1. The adjacent-base-station information storage unit 13 stores the adjacent base-station information in association with information of the frequencies of signals transmitted from the base station.

The report-time information storage unit 14 stores the report-time information indicating the time at which the base station reports the adjacent base-station information.

The controlling unit 15 controls the individual units in the radio communication terminal device 10. The controlling unit 15 includes a band-search execution determining unit 15a, a carrier-search execution determining unit 15b, a band-search controlling unit 15c, and a carrier-search controlling unit 15d.

The band-search execution determining unit 15a and the carrier-search execution determining unit 15b are one example of the search-execution controlling unit 5 illustrated in FIG. 1. By referring to the adjacent base-station information, the band-search execution determining unit 15a determines whether or not the band search is to be performed on a certain frequency. By referring to the adjacent-base-station information storage unit 13, the carrier-search execution determining unit 15b determines whether or not the carrier search is to be executed on a certain frequency.

The band-search controlling unit 15c has a function of the frequency searching unit 3 illustrated in FIG. 1. The band-search controlling unit 15c searches for frequencies at which radio waves arrive at the radio communication terminal device 10. As in the first embodiment, results of the search performed by the band-search controlling unit 15c will hereinafter be referred to as "frequency candidates".

The carrier-search controlling unit 15d has a function of the communication-carrier searching unit 4 illustrated in FIG. 1. On the basis of the reported communication carrier identification information, the carrier-search controlling unit 15d performs the carrier search on each frequency candidate.

The search-result storage unit 16 has a function of the search-research storage unit 6 illustrated in FIG. 1. That is, the search-result storage unit 16 stores results of the band search and the carrier search.

Figure 4:
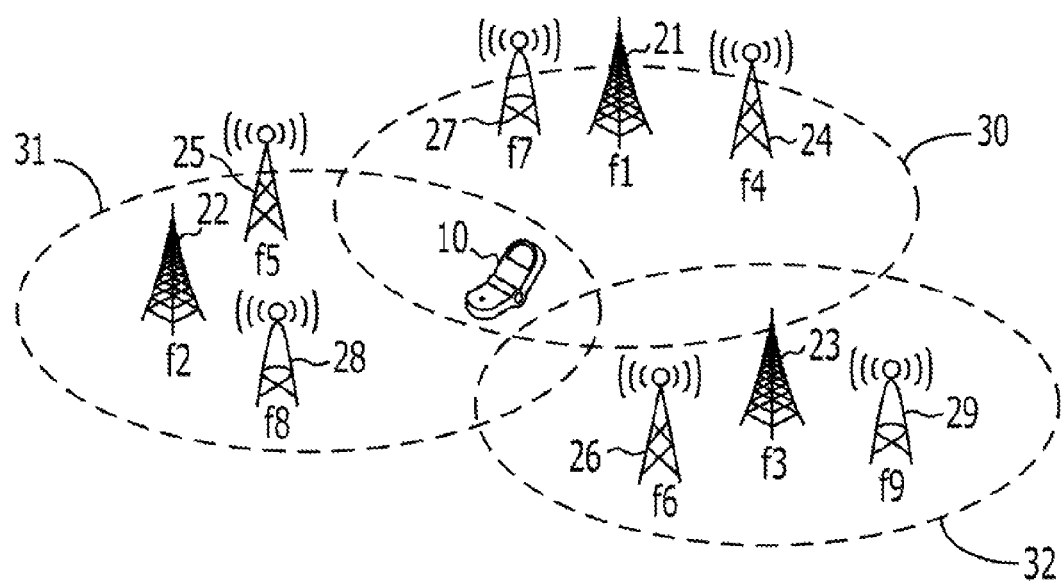
FIG. 4 is a diagram illustrating one example of a group of base stations for communicating with the radio communication terminal device according to the second embodiment.

FIG. 4 is a diagram illustrating one example of a group of base stations for communicating with the radio communication terminal device according to the second embodiment.

Base stations 21, 22, and 23 belong to the same communication carrier. Base stations 24, 25, and 26 belong to the same communication carrier. Base stations 27, 28, and 29 belong to the same communication carrier.

That is, the base stations 21, 24, and 27 belong to the communication carriers that are different from one another.

For example, the base stations 21 to 23 belong to company A, the base stations 24 to 26 belong to company B, and the base stations 27 to 29 belong to company C. These base stations 21 to 29 provide communication areas. For example, the base station 21 provides a communication area 30, the base station 22 provides a communication area 31, and the base station 23 provides a communication area 32.

The base stations 21 to 29 use respective frequencies f1 to f9 (as described above and illustrated in FIG. 2) to perform radio communication with the radio communication terminal device 10.

An operation of the radio communication terminal device 10 will be described below in conjunction with an example of a case using a communication system as described above.

Figure 5:
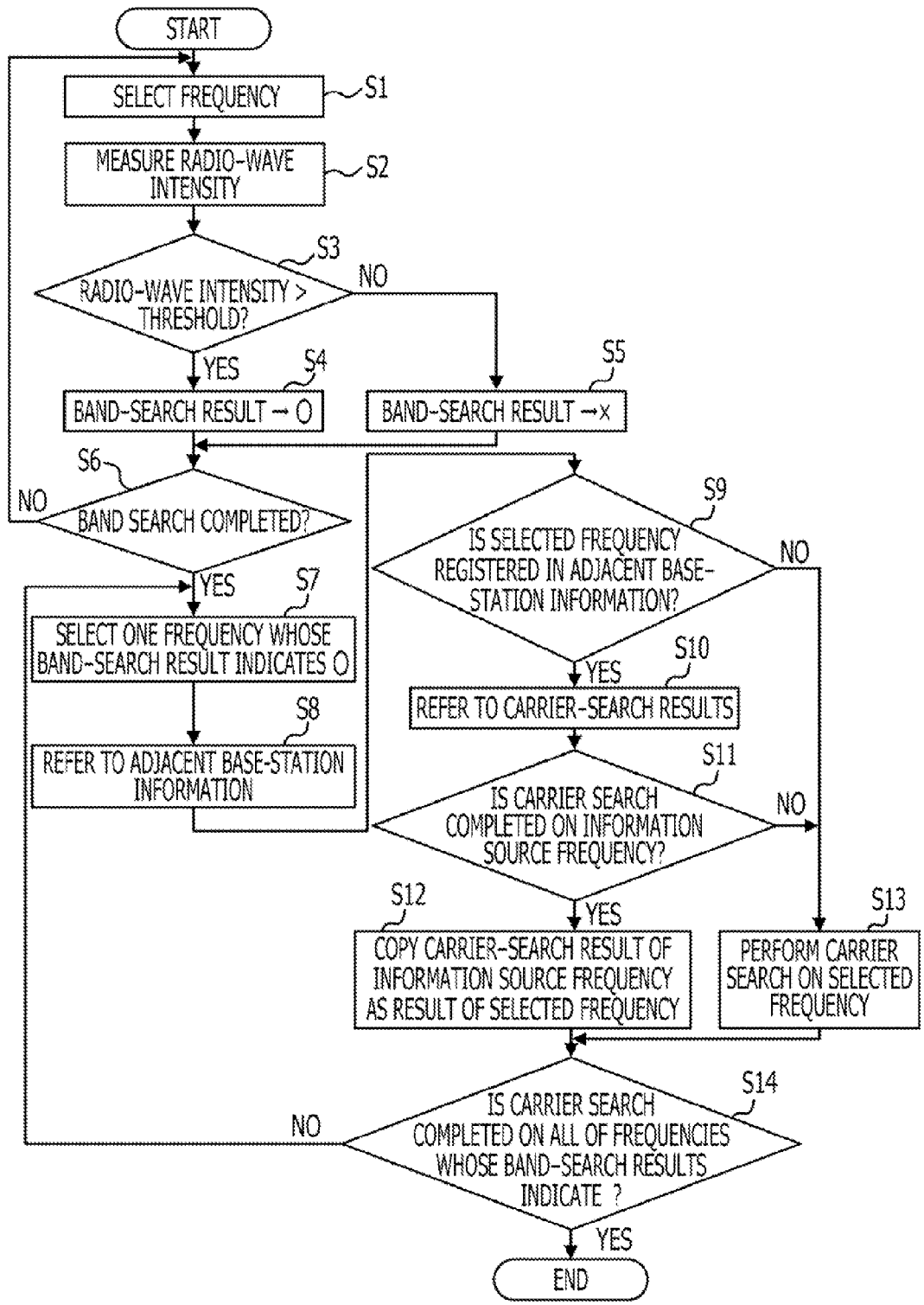
FIG. 5 is a flowchart illustrating one example of an operation of the radio communication terminal device according to the second embodiment.

FIG. 5 is a flowchart illustrating an operation flow of the radio communication terminal device according to the second embodiment.

Moreover, the below-described processing that the radio communicating unit 11, the carrier-search execution determining unit 15b, the band-search controlling unit 15c, and the carrier-search controlling unit 15d in FIG. 3 perform is realized by the processor 101 (see FIG. 16). In addition, the adjacent-base-station information storage unit 13 and the search-result storage unit 16 in FIG. 3 may be included in the flash memory 103 (see FIG. 16).

When the radio communication terminal device 10 is powered on or when the radio communication terminal device 10 is outside the communication service area, in operation S1, the band-search controlling unit 15c selects one frequency on which the band search is to be performed from a frequency band for radio communication and then starts the band search.

In operation S2, the radio communicating unit 11 receives a radio wave at the selected frequency. The band-search controlling unit 15c measures the radio-wave intensity of the received radio wave.

In operation S3, the band-search controlling unit 15c determines whether or not the measured radio-wave intensity is higher than a predetermined threshold.

When the measured radio-wave intensity is higher than the threshold, the process proceeds to operation S4 in which the band-search controlling unit 15c determines that a sufficiently strong radio wave arrives. The band-search controlling unit 15c then stores the result of the determination in the search-result storage unit 16. For example, the band-search controlling unit 15c stores "○" in the search-result storage unit 16 as the band-search result.

When the measured radio-wave intensity is lower than or equal to the threshold, the process proceeds to operation S5 in which the band-search controlling unit 15c determines that no radio wave arrives. The band-search controlling unit 15c then stores the result of the determination in the search-result storage unit 16. For example, the band-search controlling unit 15c stores "x" in the search-result storage unit 16 as a band-search result.

In operation S6, the band-search controlling unit 15c determines whether or not the band search is completed on all of the frequencies in the frequency band for radio communication. When the band search is not completed on all of the frequencies, the band-search controlling unit 15c repeatedly performs the processing in operation S1 and the subsequent operations. When the band search is completed, the band-search controlling unit 15c outputs a signal to that effect.

FIG. 6 illustrates one example of the band-search results stored in the search-result storage unit in the second embodiment.

The search-result storage unit 16 stores the band-search results of frequencies on which the band search was performed. For example, the search-result storage unit 16 stores information indicating a band-search result (○ or x) for each frequency for radio communication. In the example illustrated in FIG. 6, the band-search results of the frequencies f1 and f2 indicate ○. That is, these band-search results indicate that a sufficiently strong radio wave arrives at the frequencies f1 and f2.

In operation S7, when the signal indicating that the band search is completed is input from the band-search controlling unit 15c, the carrier-search execution determining unit 15b refers to the band-search results stored in the search-result storage unit 16. The carrier-search execution determining unit 15b then selects one frequency from the frequency candidates whose band-search results indicate "○". As in the first embodiment, the frequency selected by the carrier-search execution determining unit 15b will hereinafter be referred to as a "selected frequency".

In operation S8, the carrier-search execution determining unit 15b refers to the adjacent base-station information stored in the adjacent-base-station information storage unit 13.

FIG. 7 illustrates one example of the adjacent base-band information stored in the adjacent-base-station information storage unit in the second embodiment.

The adjacent base-station information includes the frequencies of the base station that is the information source of the adjacent base-station information and the information of the frequencies of the adjacent base stations belonging to the same communication carrier as the base station. For example, frequencies f1 to f3 of base stations 21 to 23 belonging to the same communication carrier, as illustrated in FIG. 4, are managed in association with each other.

The adjacent base-station information also includes information indicating whether or not the base station that is the information source of the adjacent base-station information is in synchronization (frame synchronization) with the adjacent base stations indicated in the adjacent base-station information. Processing using the information included in the adjacent base-station information is described below.

In operation S9, the carrier-search execution determining unit 15b determines whether or not the frequency selected in the processing in operation S7 is registered in the adjacent base-station information.

When the selected frequency is registered in the adjacent base-station information, the process proceeds to operation S10 in which the carrier-search execution determining unit 15b refers to the carrier-search results stored in the search-result storage unit 16.

Figure 8:
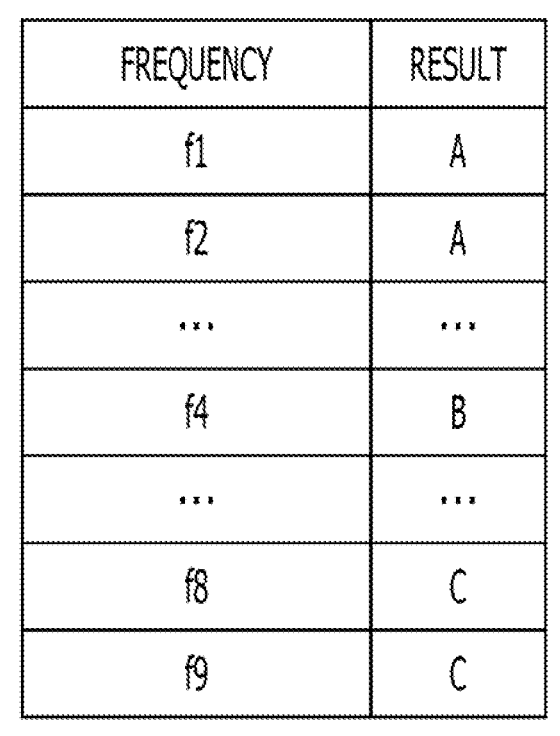

FIG. 8 illustrates one example of the carrier-search results stored in the search-result storage unit in the second embodiment.

The search-result storage unit 16 manages the carrier-search results. For example, as illustrated in FIG. 8, the search-result storage unit 16 stores A (e.g., company A) for the frequencies f1 and f2, B (e.g., company B) for the frequency f4, and C (e.g., company C) for the frequencies f8 and f9. That is, the communication carrier for each frequency on which the carrier search is completed is managed in the search-result storage unit 16.

In operation S11, by referring to the adjacent base-station information including the frequency selected in operation S7, the carrier-search execution determining unit 15b determines the base station that is the source of the referred-to adjacent base-station information. By referring to the carrier-search result, the carrier-search execution determining unit 15b determines whether or not carrier search is completed on the frequency of the source base station of the adjacent base-station information (this frequency is hereinafter referred to as an "information source frequency").

A description will be given of an example of a case in which the carrier-search execution determining unit 15b selects the frequency f3 of the base station 23 in the processing in operation S7. In this case, the frequency f3 is registered in the adjacent base-station information illustrated in FIG. 7. It can be found that the frequency f3 is a frequency used by the adjacent base station of the base station that performs transmission at the frequency f1. Accordingly, the carrier-search execution determining unit 15b refers to the carrier-search results to check whether or not the carrier search on the frequency f1 is completed. In the example illustrated in FIG. 8, "A" is registered for the adjacent base-station information as the carrier-search result of the frequency f1.

In operation S12, when the carrier search is completed on the information source frequency, the carrier-search execution determining unit 15b uses the carrier-search result as the carrier-search result of the selected frequency. The carrier-search execution determining unit 15b then stores the carrier-search result of the selected frequency in the search-result storage unit 16. For example, the carrier search on the information source frequency f1 for the adjacent base-station information including the frequency f3 is completed as described above. Thus, the carrier-search execution determining unit 15b uses, as the carrier-search result of the frequency f3, "A" that is the carrier-search result of the frequency f1.

The carrier-search execution determining unit 15b then notifies the carrier-search controlling unit 15d that the selected frequency is to be excluded from the carrier search. As a result, the carrier search on the selected frequency is skipped.

When the selected frequency is not registered in the adjacent base-station information or when the carrier search is not completed on the information source frequency in the adjacent base-station information including the selected frequency, the radio communication terminal device 10 performs processing in operation S13. In this case, the carrier-search execution determining unit 15b causes the carrier-search controlling unit 15d to execute the carrier search on the selected frequency.

The carrier-search controlling unit 15d obtains the communication carrier identification information reported at regular periods from the base station that performs transmission at the selected frequency. For example, in WiMAX, the communication carrier identification information is contained in a control message called a "downlink channel descriptor (DCD)".

On the basis of the obtained communication carrier information, the carrier-search controlling unit 15d performs the carrier search.

In operation S14, the carrier-search execution determining unit 15b determines whether or not the carrier search is completed on all of the frequencies (all of the frequency candidates) whose band-search results indicate "○". When the carrier search on all of the frequency candidates is not completed, the carrier-search execution determining unit 15b repeatedly performs the processing in operation S7 and the subsequent operations. When the carrier search on all of the frequency candidates is completed, the carrier-search execution determining unit 15b ends the processing.

According to the radio communication method described above, when a frequency whose carrier is known is included in the frequencies at which radio waves arrive, a frequency on which the carrier search can be omitted based on the known frequency existing. That is, each time the carrier search is executed, the number of frequencies on which the carrier search can be omitted increases. That is, since performing the carrier search on some of the frequencies at which radio waves arrive is sufficient, the time taken for the carrier search can be reduced.

In the embodiment described above, when the carrier search is already completed on the information source frequency, the result of the search is used as the carrier-search result of the selected frequency. However, when the carrier search is completed on at least one frequency in the adjacent base-station information including the selected frequency, the carrier-search result may also be used as the carrier-search result of the selected frequency.

For example, in the example of the adjacent base-station information illustrated in FIG. 7, when the selected frequency is f3, the carrier search on the information source frequency f1 is not completed. However, when the carrier search on the frequency f2 is completed, the carrier-search result may also be used as the carrier-search result of the frequency f3.

Figure 9:
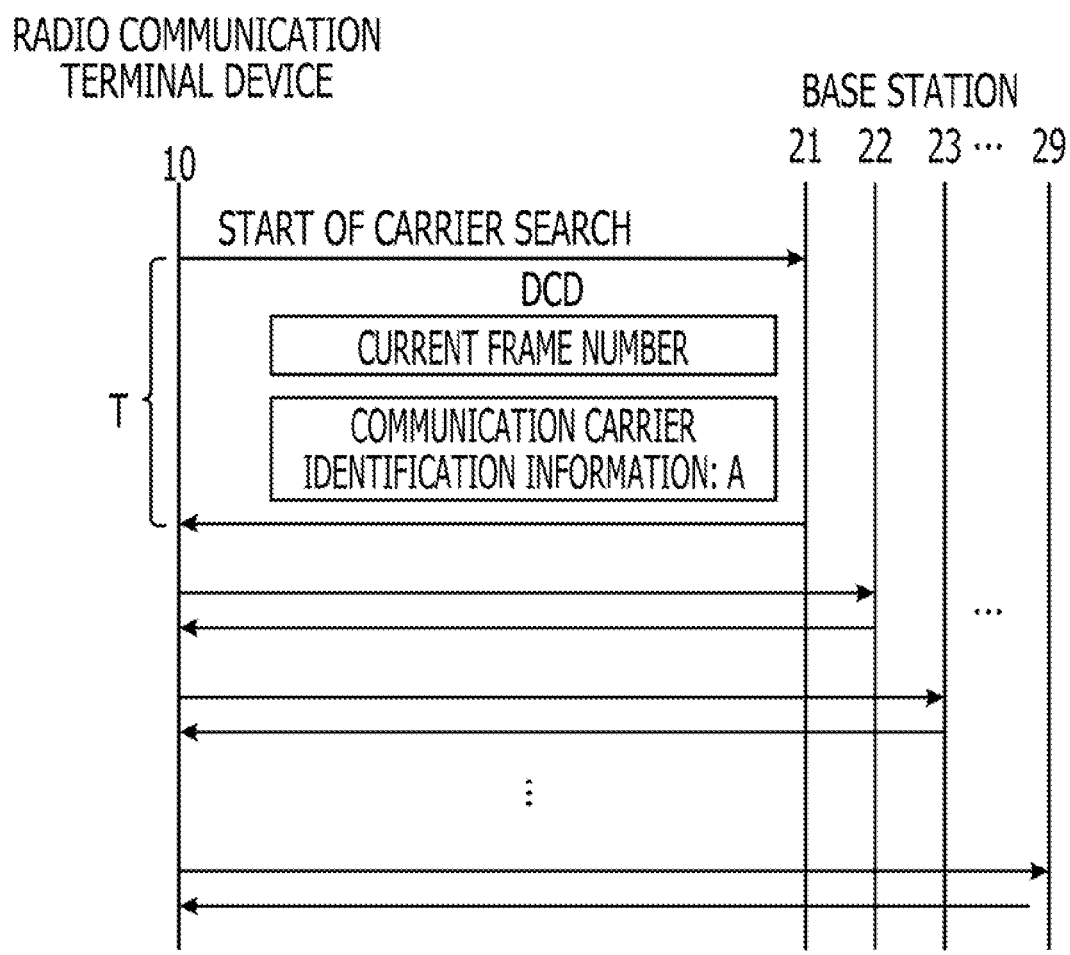
FIG. 9 is a communication sequence diagram illustrating one example of carrier search performed on all frequencies at which radio waves arrive.

FIG. 9 is a communication sequence diagram illustrating one example of carrier search performed on all frequencies at which radio waves arrive.

Figure 10:
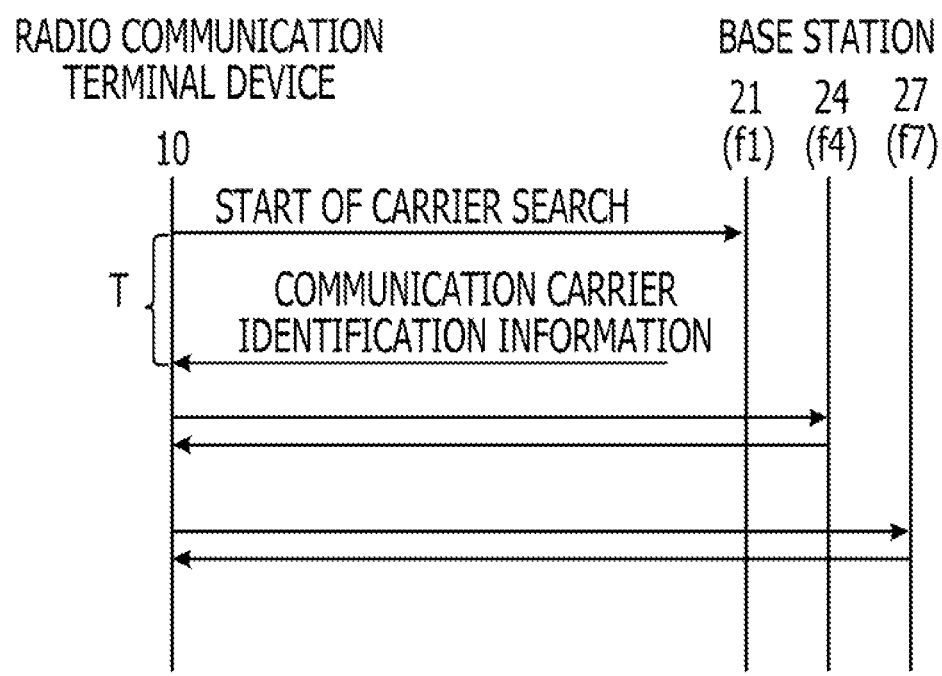
FIG. 10 is a communication sequence diagram illustrating one example of a radio communication method according to the second embodiment.

FIG. 10 is a communication sequence diagram illustrating one example of the radio communication method according to the second embodiment.

A radio communication system executes the processing illustrated in FIGS. 9 and 10 and is assumed to include the radio communication terminal device 10 and the base stations 21 to 29 illustrated in FIG. 4.

In FIG. 9, the base station 21 reports communication carrier identification information indicating "A". The communication carrier identification information reported by the base station 21 includes a DCD. The DCD also includes information of a frame number. The DCD is reported at regular periods. It is thus assumed that a maximum of time T is taken from when the radio communication terminal device 10 starts the carrier search until the communication carrier identification information is received. If the carrier search is executed on all frequencies at which radio waves arrive, the communication carrier identification information needs to be received from the base stations 21 to 29. That is, a maximum of time 9T is taken until the reception of the communication carrier identification information from the base stations 21 to 29 is completed.

In the radio communication method according to the second embodiment, a frequency on which the carrier search can be omitted exists, as described above. Thus, the radio communication terminal device 10 executes the carrier search on only a specific frequency, as illustrated in FIG. 10.

The radio communication terminal device 10 first selects the frequency f1. In this case, since the adjacent base-station information including the frequency f1 is not available, the radio communication terminal device 10 executes the carrier search on the frequency f1. By using the frequency f1, the radio communication terminal device 10 obtains the adjacent base-station information and the communication carrier identification information. The received adjacent base-station information is frequency information used by the base stations 22 and 23. Thus, the information of the frequencies f2 and f3 can be obtained. In addition, since the communication carrier identification information indicates "A", it can be known that the communication carrier using the frequency f1 is A. Thus, the radio communication terminal device 10 registers "A" as the carrier-search result of the frequency f1.

The radio communication terminal device 10 then selects the frequency f2 and refers to the adjacent base-station information including the frequency f2. In this case, it can be known that the frequency f1 is the information source frequency. Thus, the radio communication terminal device 10 uses the carrier-search result of the frequency f1 as the carrier-search result of the frequency f2. The radio communication terminal device 10 registers "A" as the carrier-search result of the frequency f1.

The radio communication terminal device 10 executes processing on the frequencies f3 to f9 in the same manner as described above. At this point, the radio communication terminal device 10 performs the carrier search on only the frequencies f4 and f7. Thus, the communication carrier identification information received by the radio communication terminal device 10 is communication carrier identification information reported by the base stations 24 and 27.

When the amount of time in which the radio communication terminal device 10 performs the carrier search once is indicated by time T, the amount of time taken for the radio communication terminal device 10 to perform the carrier search is time 3T.

As described above, since the radio communication terminal device and the radio communication method according to the second embodiment reduce the time taken for the carrier search, the communication service can be quickly received.

[c] Method for Obtaining Adjacent Base-Station Information

A method for obtaining the adjacent base-station information will be described below. For example, the adjacent base-station information is reported from the base station at a predetermined time.

FIG. 11 illustrates one example of the adjacent base-station information.

The adjacent base-station information includes the frame number of a frame reported from the base station and the frequencies of adjacent base stations. In FIG. 11, information regarding the frequencies f2 and f3 of the adjacent base stations (the base stations 22 and 23) of the same communication carrier as the base station 21 that performs transmission at the frequency f1 illustrated in FIG. 4 is included in the adjacent base-station information.

When the radio communicating unit 11 receives the adjacent base-station information, the analyzing unit 12 analyzes the received information. Upon knowing that the received information is adjacent base-station information, the analyzing unit 12 associates the received adjacent base-station information and the frequency of the base station that reported the adjacent base-station information and stores the associated information and frequency in the adjacent-base-station information storage unit 13 (see FIG. 7).

A first obtaining method for obtaining the adjacent base-station information will be described below.

During the carrier search on a certain frequency, the radio communication terminal device 10 obtains the adjacent base-station information at the certain frequency. The source of the adjacent base-station information is the base station using the frequency on which the carrier search is being performed (refer to operation S13 in FIG. 5).

Figure 12:
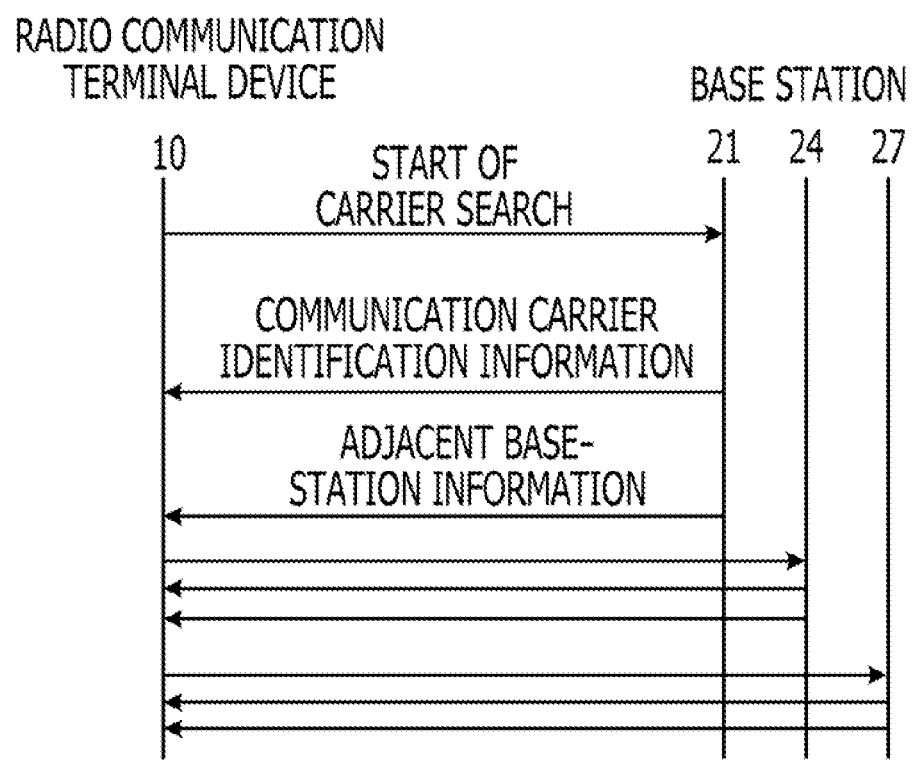
FIG. 12 is a communication sequence diagram illustrating one example of reception timing of the adjacent base-station information.

FIG. 12 is a communication sequence diagram illustrating one example of reception timing of the adjacent base-station information.

During execution of the carrier search on the frequency f1, the radio communication terminal device 10 receives the communication carrier identification information from the base station 21 that performs transmission at the frequency f1. In addition, the radio communication terminal device 10 receives the adjacent base-station information from the base station 21. Although a case in which the adjacent base-station information is reported after the communication carrier identification information is reported is illustrated in FIG. 12, the timings of the reporting may be reversed.

Since the above-described processing allows the adjacent base-station information to be obtained from the base station using the frequency on which the carrier search is being performed, the radio communicating unit 11 does not need to set the frequency in order to merely obtain the adjacent base-station information.

A second obtaining method for obtaining the adjacent base-station information will be described below.

The radio communication terminal device 10 obtains the adjacent base-station information by matching the reporting timing of the adjacent base-station information with the timing of the carrier search.

For example, the radio communication terminal device 10 obtains information including the report time of the adjacent base-station information during the band search (operations S1 to S6 illustrated in FIG. 5). For example, in WiMAX, the report time of the adjacent base-station information is contained in a control message called a DL-MAP (Down Link-Mapping message). In other radio communication schemes, the information including the report time of the adjacent base-station information is also reported through the use of the control message or the like.

FIG. 13 illustrates one example of the DL-MAP.

The DL-MAP includes information of the frame number of a frame reported from the base station, an information type, and information regarding the report time of the information. In the DL-MAP in FIG. 13, the adjacent base-station information is specified as the information type and the time at which the adjacent base-station information is reported is indicated using a frame.

When the radio communicating unit 11 receives a DL-MAP as described above, the analyzing unit 12 analyzes the received DL-MAP, associates the report time with the frequency at which the DL-MAP was received, and stores the associated report time and frequency in the report-time information storage unit 14.

FIG. 14 illustrates an example of the report-time information.

The report-time information storage unit 14 stores the report times of the adjacent base-station information in association with the frequencies of the base stations. The report-time information illustrated in FIG. 14 contains report frame numbers as the report times.

At timing prior to the report time stored in the report-time information storage unit 14, the carrier-search execution determining unit 15b in the controlling unit 15 selects the frequency associated with the report time. The carrier-search execution determining unit 15b performs the processing in operation S8 (illustrated in FIG. 5) on the selected frequency. During the carrier search, the carrier-search execution determining unit 15b executes the processing in operation S13 (illustrated in FIG. 5) in accordance with the report time of the adjacent base-station information. The carrier-search execution determining unit 15b causes the carrier-search controlling unit 15d to execute the carrier search. With this arrangement, the adjacent base-station information can be obtained during the carrier search.

A third obtaining method for obtaining the adjacent base-station information will be described below.

The radio communication terminal device 10 may start the carrier search on the selected frequency, on the basis of the information of the report time at the base station that uses a frequency other than the selected frequency.

When multiple base stations are in synchronization with each other, the adjacent base-station information is reported from the base stations at the same report time. Thus, the carrier search on a frequency used by one base station may be started on the basis of the report-time information reported from the other synchronizing base station.

For example, when the radio communication terminal device 10 refers to the adjacent base-station information (operation S8 illustrated in FIG. 5) during the carrier search on the frequency f2, the radio communication terminal device 10 also refers to the frame-synchronization information (see FIG. 7) included in the adjacent base-station information. For example, in FIG. 7, the adjacent base station information in which the information source is the base station using the frequency f1 indicates that the base station using the frequency f1 and the base station using the frequency f2 are in frame synchronization with each other.

Thus, when the carrier search is to be performed on the frequency f2 in the processing in operation S13 illustrated in FIG. 5, the carrier-search execution determining unit 15b causes the carrier search on the frequency f2 to be executed in accordance with the report-time information obtained during the band search on the frequency f1. The report-time information indicates the time at which the base station using the frequency f1 reports the adjacent base-station information. The base station using the frequency f1 and the base station using the frequency f2 are in frame synchronization with each other.

With this arrangement, during the carrier search on the frequency f2, the radio communication terminal device 10 can obtain the adjacent base-station information from the base station using the frequency f2.

As described above, the radio communication terminal device 10 executes the carrier search on the frequency of one base station in accordance with the report time reported from another base station that is in frame synchronization with that base station.

With this arrangement, during the carrier search, the radio communication terminal device 10 can obtain the adjacent base-station information from the base station using the frequency on which the carrier search is being performed.

A fourth obtaining method for obtaining the adjacent base-station information will be described below.

In the above-described method for obtaining the adjacent base-station information, the adjacent base-station information is obtained during the carrier search. In contrast, in the fourth obtaining method, the adjacent base-station information is obtained during the band search.

Figure 15:
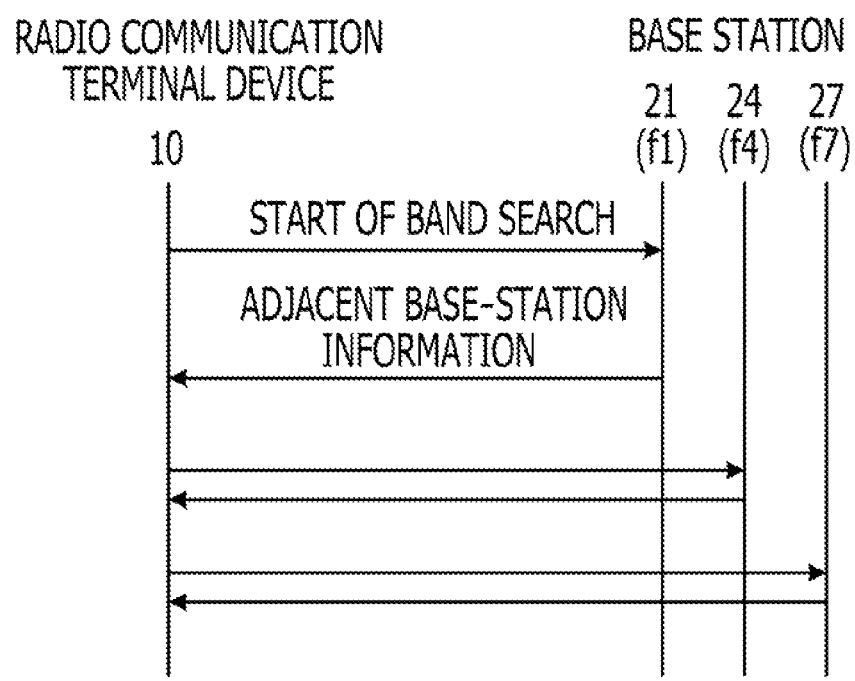
FIG. 15 is a communication sequence diagram illustrating one example of reception timing of the adjacent base-station information.

FIG. 15 is a communication sequence diagram illustrating one example of reception timing of the adjacent base-station information.

For example, during execution of the band search on the frequency f1, the radio communicating unit 11 obtains the adjacent base-station information from the base station 21 that performs transmission at the frequency f1. The analyzing unit 12 analyzes the adjacent base-station information and stores the analyzed information in the adjacent-base-station information storage unit 13 in association with the frequency f1 (see FIG. 7).

The band-search execution determining unit 15a determines whether or not the frequency selected in the processing in operation S1 in FIG. 5 is included in the adjacent base-station information. When the selected frequency is included in the adjacent base-station information, the band-search execution determining unit 15a determines that a radio wave arrives at the selected frequency. The band-search execution determining unit 15a causes the band-search controlling unit 15c to omit the band search processing in operations S2 and S3 in FIG. 5 and to store, in the search-result storage unit 16, ○ as a band-search result for the frequency.

As a result, the band search on the frequencies included in the adjacent base-station information is omitted. The frequencies f4 and f7 are not included in the adjacent base-station information reported from the base station 21. Thus, the band search is performed on the frequencies f4 and f7. Similarly, during execution of the band search on the frequencies f4 and f7, the radio communicating unit 11 receives the adjacent base-station information of the base stations 24 and 27.

As described above, the obtained adjacent base-station information is referred to during the carrier search (operation S8 in FIG. 5) and then the above-described processing in operation S9 and the subsequent operations in FIG. 5 is executed.

Since processing as described above allows the adjacent base-station information to be obtained from the base station using the frequency on which the band search is being performed, the radio communicating unit 11 does not need to set the frequency in order to merely obtain the adjacent base-station information.

Since the band search on the frequencies included in the obtained adjacent base-station information can be omitted, the time taken for the band search can be reduced. Thus, the radio communication terminal device can more quickly receive a communication service.

[d] One Example of Hardware Configuration of Radio Communication Terminal Device The functions in FIGS. 1 and 3 and the above-described processing may be realized by hardware as described below.

Figure 16:
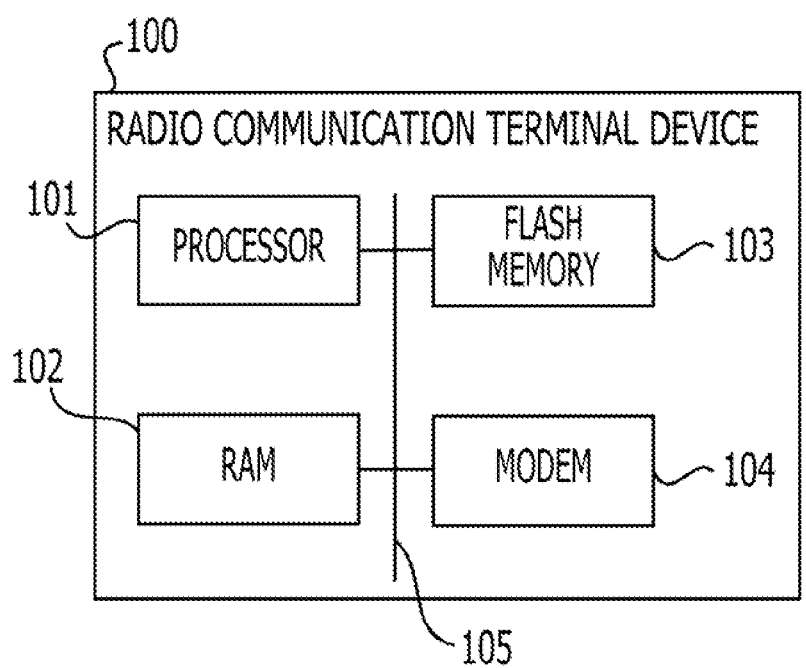
FIG. 16 is a block diagram illustrating one example of hardware included in the radio communication terminal device.

FIG. 16 is a block diagram illustrating an example of the hardware of a radio communication terminal device.

A processor 101 controls overall operations of a radio communication terminal device 1 and a radio communication terminal device 100. The processor 101 is, for example, a CPU (Central Processing Unit) or a DSP (Digital Signal Processor).

A RAM (Random Access Memory) 102 and multiple peripherals are coupled to the processor 101 through a bus 105.

For example, the processor 101 realizes functions of the frequency searching unit 3, the communication-carrier searching unit 4, and the search-execution controlling unit 5 illustrated in FIG. 1 and functions of the analyzing unit 12 and the controlling unit 15 illustrated in FIG. 3.

The RAM 102 is used as a primary storage device for the radio communication terminal device 1 and the radio communication terminal device 100. The RAM 102 temporarily stores at least part of an OS (Operating System) program and application programs to be executed by the processor 101. The RAM 102 stores various types of data used for processing to be executed by the processor 101.

Examples of the peripherals coupled to the bus 105 include a flash memory 103 and a modem 104.

The flash memory 103 is used as a secondary storage device for the radio communication terminal device 1 and the radio communication terminal device 100. The flash memory 103 stores the OS program, application programs, and various types of data.

For example, the flash memory 103 includes the functions of the storage unit 2 and the search-research storage unit 6 in the radio communication terminal device 1 described above and illustrated in FIG. 1 and the functions of the adjacent-base-station information storage unit 13, the report-time information storage unit 14, and the search-result storage unit 16 in the radio communication terminal device 10 described above and illustrated in FIG. 3.

For example, the modem 104 includes the functions of the radio communicating unit 11 illustrated in FIG. 3. The modem 104 performs radio communication with the base station.

Hardware as described above may be used to realize the functions illustrated in FIGS. 1 and 3 and the above-described processing.

The radio communication terminal device and the radio communication method according to the embodiments of the present invention have been described above in conjunction with the particular embodiments. However, the disclosed device and method are merely examples and are not limited to those described above.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio communication terminal device comprising:
    a memory configured to store information about frequencies of an adjacent base station; and
    a processor coupled to the memory and configured
    to detect candidate frequencies, each of the candidate frequencies being operated by one of network operators respectively,
    to perform, for a selected frequency of the candidate frequencies being operated, a processing for detecting a network operator of the network operators that operates the selected frequency, by receiving a radio signal at the selected frequency from a base station, and
    to exclude frequencies from the candidate frequencies based on the information about frequencies of the adjacent base station, the excluded frequencies not being subjected to the processing for detecting the network operator, and
    a modem that obtains group information including the selected frequency from a base station operating the selected frequency, during the processing for detecting the network operator operating the selected frequency,
    wherein the modem obtains report-time information indicating time at which the group information is reported from the base station; and
    on a basis of the report-time information, the processor performs the processing for detecting the network operator operating the selected frequency.

2. The radio communication terminal device according to claim 1, wherein, when another network operator operating another frequency is known before the processing for detecting the network operator operating the frequency is performed, the processor excludes the another known frequency from the candidate frequencies.

3. The radio communication terminal device according to claim 1, wherein
    the processor detects the candidate frequencies at which radio waves arrive; and
    the modem obtains the group information including the selected frequency from the base station operating the selected frequency at which the radio wave arrives, during the processing for detecting the network operator operating the selected frequency.

4. The radio communication terminal device according to claim 1, wherein the processor excludes, from the candidate frequencies, frequencies based on group information stored in the memory.

5. The radio communication terminal device according to claim 1,
    wherein the information about frequencies of the adjacent base station indicates that another frequency is operated by the network operator operating the selected frequency.

6. The radio communication terminal device according to claim 1,
    wherein the processor is configured not to perform the processing for another frequency of a detected network operator when the network operator is not a specified network operator of the network operators.

7. A radio communication terminal device comprising:
    a memory configured to store information about frequencies of an adjacent base station; and
    a processor coupled to the memory and configured
    to detect candidate frequencies, each of the candidate frequencies being operated by one of network operators respectively,
    to perform, for a selected frequency of the candidate frequencies being operated, a processing for detecting a network operator of the network operators that operates the selected frequency, by receiving a radio signal at the selected frequency from a base station, and to exclude frequencies from the candidate frequencies based on the information about frequencies of the adjacent base station, the excluded frequencies not being subjected to the processing for detecting the network operator, and a modem that obtains group information including the selected frequency from a base station operating the selected frequency, during the processing for detecting the network operator operating the selected frequency, wherein the modem obtains, from another base station that is in synchronization with the base station, report-time information indicating time at which group information including a frequency operated by the another base station is reported; and on a basis of the report-time information, the processor performs the processing for detecting the network operator operating the selected frequency.

8. A radio communication method performed in a communication terminal device, the method comprising:

storing, in a memory, information about frequencies of an adjacent base station;

detecting candidate frequencies with a processor, each of the candidate frequencies being operated by one of network operators respectively, performing, for a selected frequency of the candidate frequencies being operated, a processing for detecting a network operator of the network operators that operates the selected frequency, by receiving a radio signal at the selected frequency from a base station, excluding frequencies from the candidate frequencies based on the information about frequencies of the adjacent base station, the excluded frequencies not being subjected to the processing for detecting the network operator obtaining, with a modem, group information including the selected frequency from a base station operating the selected frequency, during the processing for detecting the network operator operating the selected frequency, obtaining, with the modem, report-time information indicating time at which the group information is reported from the base station; and on a basis of the report-time information, the processor performs the processing for detecting the network operator operating the selected frequency.

* * * * *